United States Patent
Naito et al.

(10) Patent No.: US 6,993,517 B2
(45) Date of Patent: Jan. 31, 2006

(54) INFORMATION RETRIEVAL SYSTEM FOR DOCUMENTS

(75) Inventors: Eiichi Naito, Kyoto (JP); Shoichi Araki, Osaka (JP); Hiroshi Kutsumi, Osaka (JP); Jun Ozawa, Nara (JP); Susumu Maruno, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 398 days.

(21) Appl. No.: 09/859,609

(22) Filed: May 17, 2001

(65) Prior Publication Data

US 2002/0065845 A1 May 30, 2002

(30) Foreign Application Priority Data

May 17, 2000 (JP) .............................. 2000-145168

(51) Int. Cl.
*G06F 17/30* (2006.01)
(52) U.S. Cl. ............................ 707/3; 707/102; 715/517
(58) Field of Classification Search .............. 707/1–10; 709/219; 345/744

See application file for complete search history.

(56) References Cited

U.S. PATENT DOCUMENTS

| | | | | |
|---|---|---|---|---|
| 6,028,601 A * | 2/2000 | Machiraju et al. | .......... | 345/705 |
| 6,029,195 A * | 2/2000 | Herz | ............. | 725/116 |
| 6,177,932 B1 * | 1/2001 | Galdes et al. | ............... | 345/733 |
| 6,243,090 B1 * | 6/2001 | Machiraju et al. | .......... | 345/709 |
| 6,256,648 B1 * | 7/2001 | Hill et al. | ................. | 715/501.1 |
| 6,434,550 B1 * | 8/2002 | Warner et al. | ................. | 707/3 |
| 2001/0047270 A1 * | 11/2001 | Gusick et al. | | |
| 2002/0054123 A1 * | 5/2002 | Walden et al. | | |

FOREIGN PATENT DOCUMENTS

| | | |
|---|---|---|
| JP | 10078969 A | 3/1998 |
| JP | 10-154182 | 6/1998 |
| JP | 10-187761 | 7/1998 |
| JP | 11-134364 | 5/1999 |
| JP | 11-272710 | 10/1999 |
| JP | 11-275137 | 10/1999 |

(Continued)

OTHER PUBLICATIONS

Robin D. Burke, et al., "Question Answering From Frequently-Asked Question Files: Experiences With The FAQ Finder System," Technical Report TR-97-05, The University Of Chicago Computer Science Department, Jun. 1997, pp1-38.

*Primary Examiner*—Mohammad Ali
*Assistant Examiner*—Sathyanarayan Pannala
(74) *Attorney, Agent, or Firm*—Harness, Dickey & Pierce, P.L.C.

(57) ABSTRACT

Questions and answers associated with each other are stored in a document storage section. A clustering section classifies the answers in the document storage section into clusters based on feature vectors of the answers. When a natural language question is input by the user, a database retrieval/updating section retrieves a question similar to the input question, and presents answers associated with the retrieved question together for each cluster to the user or an expert. In addition, the database retrieval/updating section automatically updates the document storage section based on an answer selected as most appropriate by the user or the expert if selected, or based on an answer newly input by the expert if no appropriate answer is available. The natural language answer input by the expert is presented to the user as it is.

9 Claims, 18 Drawing Sheets

FOREIGN PATENT DOCUMENTS

| | | |
|---|---|---|
| JP | 11-296552 | 10/1999 |
| JP | 2000-020541 | 1/2000 |
| JP | 2000-105768 | 4/2000 |
| JP | 2000-123028 | 4/2000 |

* cited by examiner

FIG. 2

| Document ID | Text |
|---|---|
| 1 | When you cannot suppress a desire for eating some sweet stuff, (1) eat chewy one that gives the feeling of satisfaction in a predetermined amount ... |
| 2 | As a principle, do exercise alone anytime and anywhere. Different persons have different livings and physical conditions. ... |
| 3 | You are absolutely right. If you are in trouble or ... |
| : n pcs. | : |

Document Di

FIG. 3

Retrieved __ hits.

| Cluster ID | Cluster label | Document ID | Documents |
|---|---|---|---|
| 1 | Confectionery, snack, cheese | 1 | When you cannot suppress a desire for eating some sweet stuff, (1) eat chewy one that gives the feeling of satisfaction in a predetermined amount. ... |
| | | 190 | Take milk, dairy products (cheese, yogurt, etc.) for a snack ... |
| | Watery food (jelly, pudding, yogurt)... | 432 | You may freely choose a snack within 200 kcal. ... If a low-calorie snack is desired, low-calorie sweetener ... |
| | | 644 | When you cannot suppress a desire for eating some sweet stuff, - eat chewy one that gives the feeling of satisfaction. ... all to fall within a total amount of 200 kcal per day ... |

[previous cluster]  [next cluster]

FIG. 7

| Cluster ID | Document ID |
|---|---|
| 1 | 1, 190, 432, 644 |
| 2 | 2, 412, 3, 158 |
| 3 | 3, 158 |
| 4 | 4, 109, 182, 615 |
| ⋮ | ⋮ |

| Cluster ID | Term label |
|---|---|
| 1 | sweet stuff, snack, cheese |
| 2 | physical condition, exercise, effect |
| 3 | stress, positive thinking, status |
| 4 | menses, appetite, diet |
| ⋮ | ⋮ |

| Cluster ID | Text label |
|---|---|
| 1 | Watery food (jelly, pudding, yogurt)... |
| 2 | When you are in poor physical condition during your menstrual period, do not force yourself to do exercise ... |
| 3 | Clarify the cause of the stress ... |
| 4 | Not to disturb your diet pace even before your menstrual period ... |
| : | : |

FIG. 13

| Cluster ID | Document ID | Document label |
|---|---|---|
| 1 | 1 | eat chewy one that gives the feeling of satisfaction ... |
| | 190 | Take milk, dairy products (cheese, yogurt, etc.) for a snack ... |
| | 432 | If a low-calorie snack is desired, low-calorie sweetener ... |
| | 644 | all to fall within a total amount of 200 kcal per day ... |
| | .. | .. |

FIG. 15

| Table of questions |||
|---|---|---|
| Question ID | Questions | Associated document ID |
| 1 | When I cannot suppress a desire for eating some sweet stuff, what kind of stuff may I eat? | 1 |
| 2 | I heard early morning exercise before breakfast is most effective. How about evening aerobic exercise? | 2 |
| 3 | My menses is behind more than a week this month... | 3 |
| ⋮ | ⋮ | ⋮ | n pcs.

FIG. 16

| List of answers ||
|---|---|
| Document ID | Answers |
| 1 | When you cannot suppress a desire for eating some sweet stuff, (1) eat chewy one that gives the feeling of satisfaction in a predetermined amount ... |
| 2 | As a principle, do exercise alone anytime and anywhere. Different persons have different livings and physical conditions. ... |
| 3 | You are absolutely right. If you are in trouble or ... |
| ⋮ | ⋮ | m pcs.

FIG. 17

| Question |
|---|
| When I cannot suppress a desire for eating some sweet stuff, what kind of stuff may I eat? ... |

Answers

| Cluster ID | Sentence label | Document ID | Documents |
|---|---|---|---|
| 1 | Watery food (jelly, pudding, yogurt)... | 1 | When you cannot suppress a desire for eating some sweet stuff, (1) eat chewy one that gives the feeling of satisfaction in a predetermined amount. ... |
| | | 190 | Take milk, dairy products (cheese, yogurt, etc.) for a snack ... |
| | | 432 | You may freely choose a snack within 200 kcal. ... If a low-calorie snack is desired, low-calorie sweetener ... |
| | | 644 | When you cannot suppress a desire for eating some sweet stuff, - eat chewy one that gives the feeling of satisfaction. ... all to fall within a total amount of 200 kcal per day ... |

[previous cluster] [next cluster]

FIG. 18

| Question |
| --- |
| When I cannot suppress a desire for eating some sweet stuff, what kind of stuff may I eat? |

| Answer |
| --- |
| When you cannot suppress a desire for eating some sweet stuff, (1) eat chewy one that gives the feeling of satisfaction in a predetermined amount. .... |

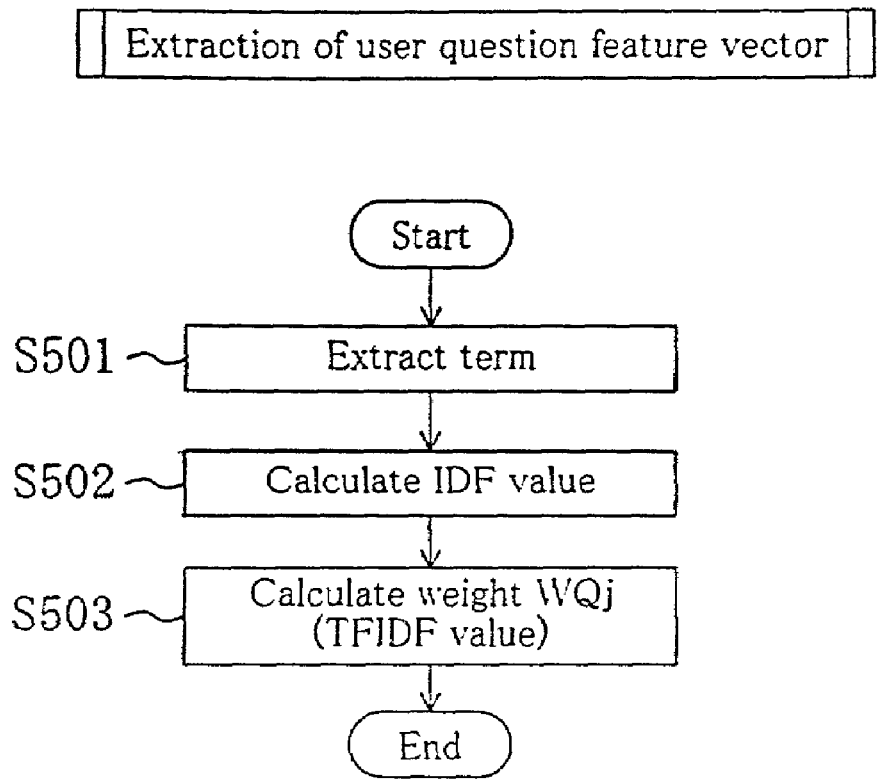

INFORMATION RETRIEVAL SYSTEM FOR DOCUMENTS

BACKGROUND OF THE INVENTION

The present invention relates to an information retrieval system that enables users to easily find information they seeks among a large amount of information.

In recent years, with widespread use of the Internet, access to a large amount of information has been made available to general users, through various home pages written in Hypertext Markup Language (HTML) provided on the World Wide Web (WWW), for example. In addition, collections of frequently asked questions (FAQ), which list pairs of frequently asked questions and answers thereto, have been made open to public. Users can obtain answers associated with their questions using such a list. These types of information are convenient for users since prompt browsing is possible as long as whereabouts of information they seek are known. In reverse, however, it is painful work for users if they have to find information they seek among a large amount of information.

A retrieval technique to overcome the above trouble is known, in which keywords are extracted from documents as feature amounts, and an inner product of the feature amounts is calculated to obtain similarity between two documents. Based on the similarity, a document similar to a question is retrieved.

This technique however has the following problems. Since information units on the Internet and FAQ collections accumulated based on past cases are provided independently by a number of individual providers, information inevitably overlaps resulting in existence of many documents having similar contents. In the conventional technique, therefore, a large number of documents having similar contents are retrieved as a document similar to a certain question. As a result, users are required to do a work of finding information they want among the large amount of documents as the retrieval results. In reverse, if the amount of retrieval results displayed is limited to a fixed number, users may fail to find information they want.

In the conventional technique, also, even if users succeed in finding information they want from the retrieval results, this matching is not reflected in the relevant FAQ collection. Accordingly, the same procedure for finding information is repeated when another user attempts retrieval using the same condition. In order to expand the FAQ collection while avoiding overlap of information, it is required to check whether or not like information already exists in the collection. This is burdensome to information providers.

SUMMARY OF THE INVENTION

An object of the present invention is providing an information retrieval system capable of reducing the burden on the user in information retrieval.

Another object of the present invention is providing an information retrieval system capable of easily updating information to be retrieved.

In order to attain the above objects, according to the present invention, feature vectors of documents are calculated, and based on the calculated feature vectors, the documents are classified into clusters, so that document retrieval results are displayed together for each cluster. This facilitates the user's grasp of the retrieval results as blocks of similar documents.

Moreover, according to the present invention, upon receipt of a question from the user, a question similar to the user question is retrieved. An answer associated with the retrieved question is presented to the user or an expert. If the user or the expert selects an answer judged most appropriate, a document database is automatically updated based on the selected answer. If there is no appropriate answer, the expert may newly enter an answer, and the document database is updated based on the expert answer. In either case, when like questions are input on subsequent occasions, an appropriate answer will be presented.

BRIEF DESCRIPTION OF THE DRAWINGS

FIG. 2 is a view showing examples of documents stored in a document storage section in FIG. 1.

FIG. 3 is a view showing an example of display of retrieval results by a user display section in FIG. 1.

FIG. 7 is a view showing examples of clustering results.

FIG. 13 is a view showing examples of prepared document labels.

FIG. 15 is a view showing a table of questions as a part of documents stored in a document storage section in FIG. 14.

FIG. 16 is a view showing a table of answers as the other part of the documents stored in the document storage section in FIG. 14.

FIG. 17 is a view showing an example of display of retrieval results by an expert display section in FIG. 14.

FIG. 18 is a view showing an example of display of retrieval results by a user display section in FIG. 14.

FIG. 19 is a flowchart of a procedure of feature vector extraction for a user question by a feature vector extraction section in FIG. 14.

FIG. 20 is a view showing examples of feature vectors extracted from the user question.

DESCRIPTION OF THE PREFERRED EMBODIMENTS

Hereinafter, two preferred embodiments of the present invention will be described with reference to the accompanying drawings.

EMBODIMENT 1

Figure 1:
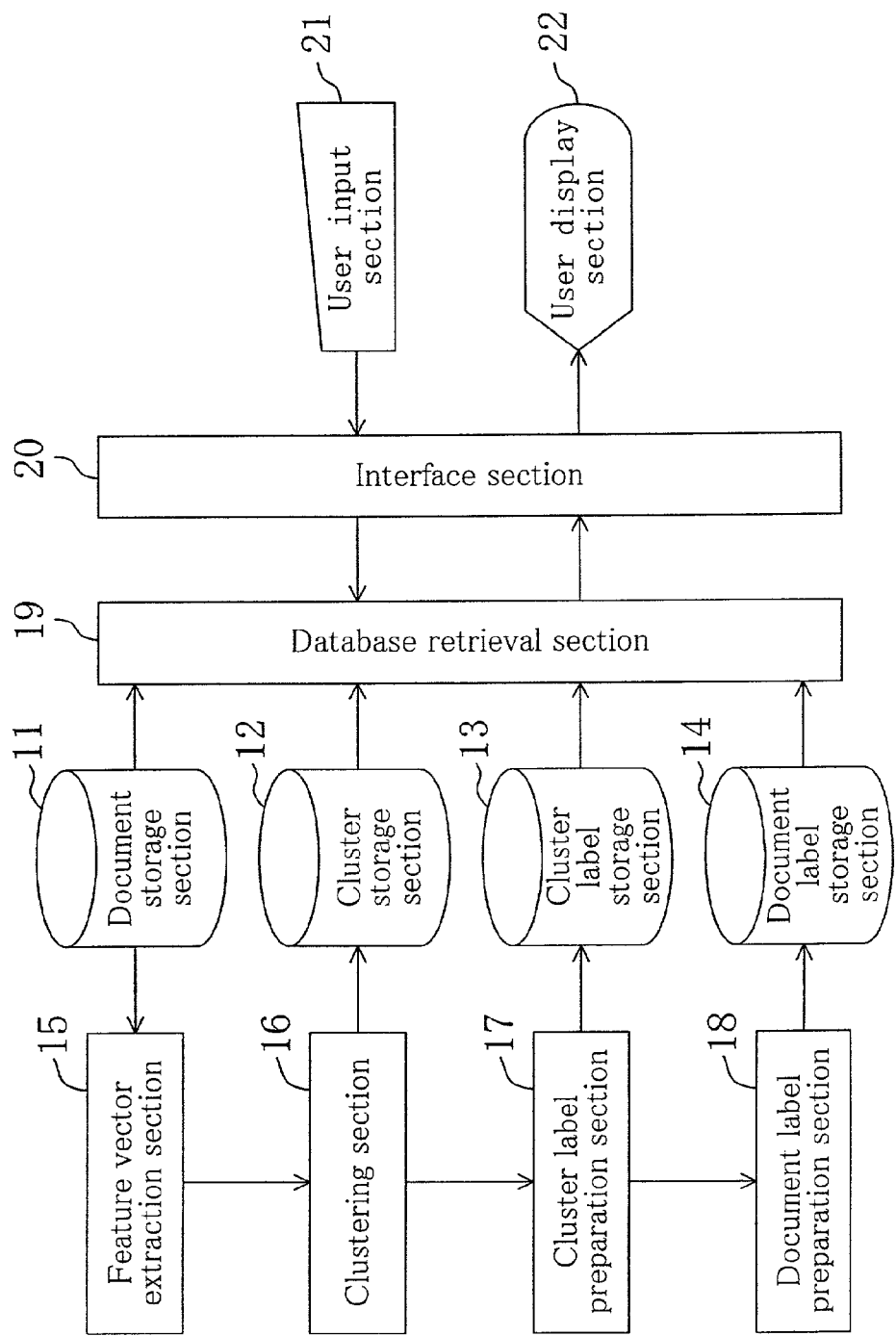
FIG. 1 is a block diagram of an information retrieval system of EMBODIMENT 1 of the present invention.

FIG. 1 illustrates a construction of the information retrieval system of EMBODIMENT 1 of the present invention. The information retrieval system of FIG. 1 includes a document storage section 11, a cluster storage section 12, a cluster label storage section 13, a document label storage section 14, a feature vector extraction section 15, a clustering section 16, a cluster label preparation section 17, a document label preparation section 18, a database retrieval section 19, an interface section 20, a user input section 21, and a user display section 22. This construction is implemented by a document server and a user terminal connected with each other via the Internet, for example. The document storage section 11 stores a plurality of documents. The feature vector extraction section 15 extracts feature vectors from the documents stored in the document storage section 11. The clustering section 16 classifies the documents stored in the document storage section 11 into clusters based on the feature vectors extracted by the feature vector extraction section 15. The cluster storage section 12 stores the clusters into which the clustering section 16 has classified the documents. The cluster label preparation section 17 prepares cluster labels representing the contents of the respective clusters created by the clustering section 16. Each cluster label may be a term label composed of a term or may be a sentence label composed of a sentence. The cluster label storage section 13 stores the cluster labels prepared by the cluster label preparation section 17. The document label preparation section 18 prepares document labels representing the contents of the documents as elements of the respective clusters created by the clustering section 16. The document label storage section 14 stores the document labels prepared by the document label preparation section 18. The user input section 21 receives a retrieval condition input by the user. Any retrieval condition may be used as long as it can be a condition for retrieval of a document, such as a keyword of the document and a document ID. The interface section 20 manages input/output with the user. The database retrieval section 19 retrieves a document that satisfies the retrieval condition, from the document storage section 11. The user display section 22 displays the retrieval results for the user.

FIG. 2 shows an example of documents stored in the document storage section 11 shown in FIG. 1. The document storage section 11 stores n (n≧2) documents as objects to be retrieved. Each document is composed of a unique document ID and a text. Hereinafter, the i-th document is denoted by $D_i$ ($1 \leq i \leq n$).

FIG. 3 shows an example of display of retrieval results by the user display section 22 shown in FIG. 1. In the example shown in FIG. 3, documents as the results of retrieval based on a certain retrieval condition are displayed together for each cluster. Specifically, the cluster ID and the document IDs and texts of the documents belonging to the cluster are displayed in the form of a table every cluster. Other clusters can be displayed by pressing "previous cluster" and "next cluster" buttons. In this way, all retrieval results can be displayed. With this construction, the user can grasp the retrieval results as blocks of similar documents. In addition, cluster labels representing the contents of the cluster are displayed for each cluster, and in the respective documents displayed, sentences specified as document labels are underlined. With this display, the user can easily grasp the contents of the cluster. Although the cluster ID and the document IDs are displayed as part of the retrieval results in the illustrated example, they may be omitted.

Hereinafter, details of EMBODIMENT 1 will be described by separating the operation thereof into document entry operation and document retrieval operation. The document entry operation is an operation relevant to the first entry of a document in the document storage section 11 or subsequent addition/change/deletion of the document if any. The document retrieval operation is an operation relevant to retrieval and browsing of the entry documents.

<Document entry operation>

Figure 4:
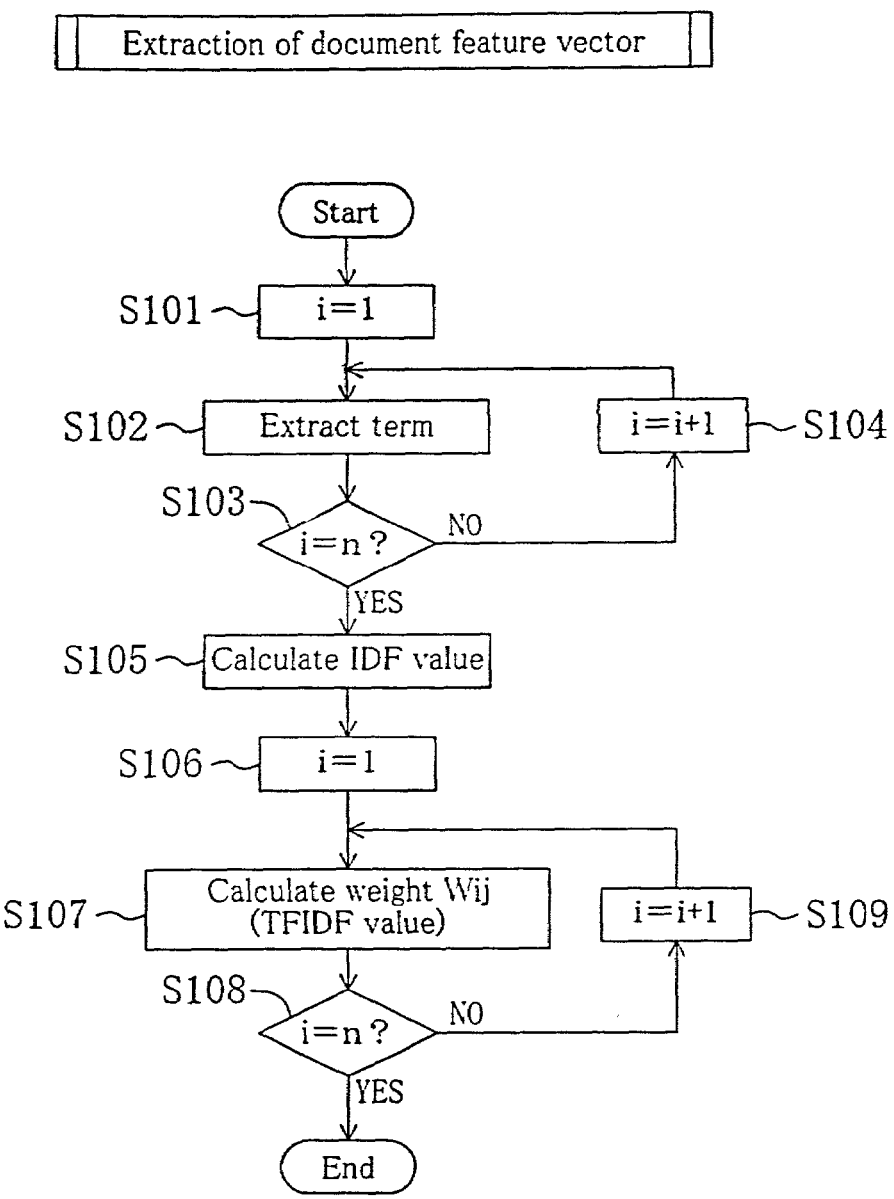
FIG. 4 is a flowchart of a procedure of processing by a feature vector extraction section in FIG. 1.

FIG. 4 shows a procedure of processing of the feature vector extraction section 15 shown in FIG. 1. First, the feature vector extraction section 15 sequentially retrieves all the documents $D_i$ stored in the document storage section 11 and extracts feature vectors $V_i$ from the documents $D_i$. The feature vector is a vector having as an element a pair of a term $T_j$ representing a feature of each document and a weight $W_{ij}$ of the term $T_j$. The number of elements depends on the document. Herein, j denotes a unique number identifying the term. Referring to FIG. 4, in step S101, a document ounter i is set at i=1. In step S102, a document $D_i$ is retrieved from the document storage section 11. A term $T_j$ appearing in the document $D_i$ is extracted from the text by a generally known method such as morphemic analysis, syntactic analysis, and removal of unnecessary terms, and the frequency $F_{ij}$ of the term $T_j$ appearing in the document $D_i$ is counted. In step S103, it is determined whether or not the processing in step S102 has been completed for all the documents. If completed, that is, i=n, the process proceeds to step S105. Otherwise, the process proceeds to step S104. In step S104, the counter i is incremented by one and the process returns to step S102. In step S105, how small the number of documents that contain the term $T_j$ is, that is, the inverse document frequency (IDF) is calculated from expression (1) below, as the importance of the term $T_j$ to all the documents.

$$IDF_j = \log \frac{n}{M_j} + 1 \tag{1}$$

where $M_j$ denotes the number of documents that contain the term $T_j$. In step S106, the document counter i is set at i=1. In step S107, as the weight $W_{ij}$ with which the term $T_j$ characterizes the document $D_i$, a TFIDF value is calculated by multiplying a term frequency (TF) representing the rate of appearance of the term $T_j$ in the document $D_i$ by the IDF value described above, from expression (2) below.

$$W_{ij} = \frac{F_{ij}}{\sum_{j:T_j \in D_i} F_{ij}} \cdot IDF_j \tag{2}$$

In step S108, it is determined whether or not the processing in step S107 has been completed for all the documents. If completed, that is, i=n, the process is terminated. Otherwise, the process proceeds to step S109. In step S109, the counter i is incremented by one and the process returns to step S107.

Figure 5:
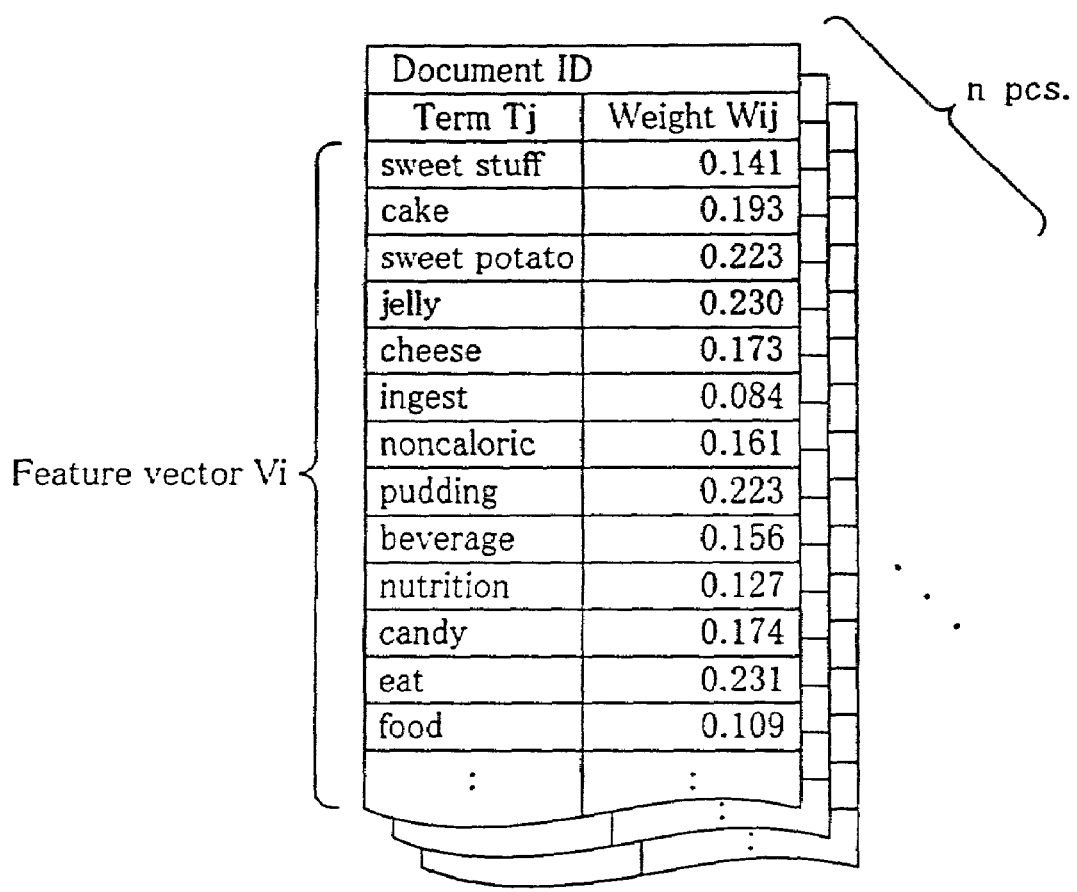
FIG. 5 is a view showing examples of extracted document feature vectors.

FIG. 5 shows examples of document feature vectors Vi extracted in the manner described above. Although the TFIDF value was used for the calculation of feature vectors described above, other calculation methods such as that simply using the frequency of appearance of a term may be adopted.

Figure 6:
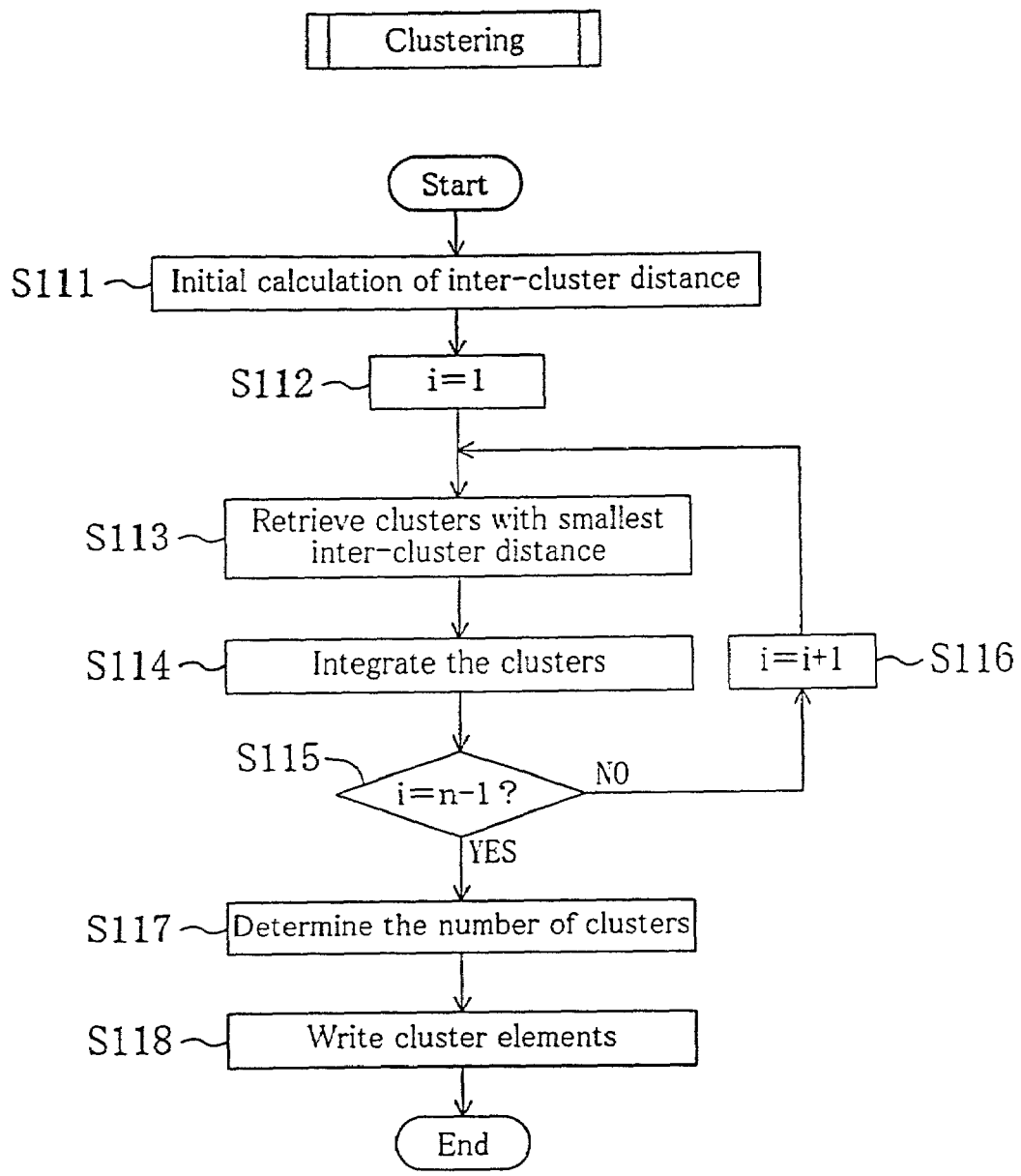
FIG. 6 is a flowchart of a procedure of processing by a clustering section in FIG. 1.

FIG. 6 shows a procedure of processing of the clustering section 16 shown in FIG. 1. The clustering section 16 classifies all the documents into m clusters (1<m<n) using the feature vectors extracted by the feature vector extraction section 15. Hereinafter, the k-th cluster is denoted by Ck ($1 \leq k \leq m$). As the clustering procedure in this embodiment, hierarchical clustering is employed in which the documents are sequentially classified into clusters in a tree-structure manner. Referring to FIG. 6, in step S111, the inter-cluster distance is initially calculated. Herein, as initial clusters, set are n clusters Ci each including only one document Di as the element. As the distance Lkl between the clusters Ck and Cl ($1 \leq k$, $1 \leq n$), adopted is a similarity ratio of expression (3) below representing the distances between feature vectors of the documents.

$$Lkl = -\log \frac{\sum_{j:Tj \in Dk \cup Dl} MIN(Wkj, Wlj)}{\sum_{j:Tj \in Dk \cup Dl} MAX(Wkj, Wlj)} \quad (3)$$

In step S112, a clustering frequency counter i is set at i=1. In step S113, a set of clusters Ck and Cl (k<l) the inter-cluster distance Lkl of which is the smallest is retrieved among all possible combinations of the clusters. In step S114, the clusters Ck and Cl are integrated to form a cluster Cg. That is, Cg=Ck∪Cl, Cl=φ (φ represents an empty set). Once the clusters are integrated, the inter-cluster distance between the integrated cluster Cg and another cluster Ch ($1 \leq h \leq n$) is calculated from expression (4) below using the Ward method.

$$Lgh = \frac{(Nk + Nh) \cdot Lkh + (Nl + Nh) \cdot Llh - Nh \cdot Lkl}{Ng + Nh} \quad (4)$$

where Nk denotes the number of elements of the cluster Ck. In step 115, it is determined whether or not the number of times of clustering is n-1. If yes, that is, if all the initial clusters have been integrated into one cluster, the process proceeds to step S117. Otherwise, the process proceeds to step S116. In step S116, the counter i is incremented by one, and the process returns to step S113. In step S117, the number of clusters is determined. In the clustering process covering steps S111 through S115, the number of clusters decreases by one every time clustering is performed. In step S117, the clustering process is retrospected to determine the appropriate number of times of clustering. Assume herein that the number of times of clustering with which the number of clusters having two or more elements becomes largest is determined as the appropriate one. In step S118, the clusters obtained at the stage of completion of the number of times of clustering determined in step S117 are written in the cluster storage section 12 together with the elements included therein.

FIG. 7 shows examples of clusters written in the cluster storage section 12. Each entry of cluster includes cluster ID and document IDs of documents included in the cluster. For example, cluster 1 includes four documents, ID Nos. 1, 190, 432, and 644. This indicates that the feature vectors of these four documents are more similar to one another compared with those of the other documents. In the illustrated example, hierarchical clustering was employed as the clustering method. Alternatively, a non-hierarchical clustering method may be used. The similarity ratio of expression (3) was used as the distance between the initial clusters. Alternatively, other distances such as the Euclidean square distance may be used. The Ward method using expression (4) was employed as the method for calculating the inter-cluster distance during the cluster integration. Alternatively, other methods such as the maximum distance method may be employed. In the determination of the number of clusters, adopted was the number of times of clustering with which the number of clusters having two or more elements was largest. Alternatively, the number of clusters may be determined so that the number of clusters is at a predetermined ratio with respect to the number of documents, for example.

Figures 8, 9:
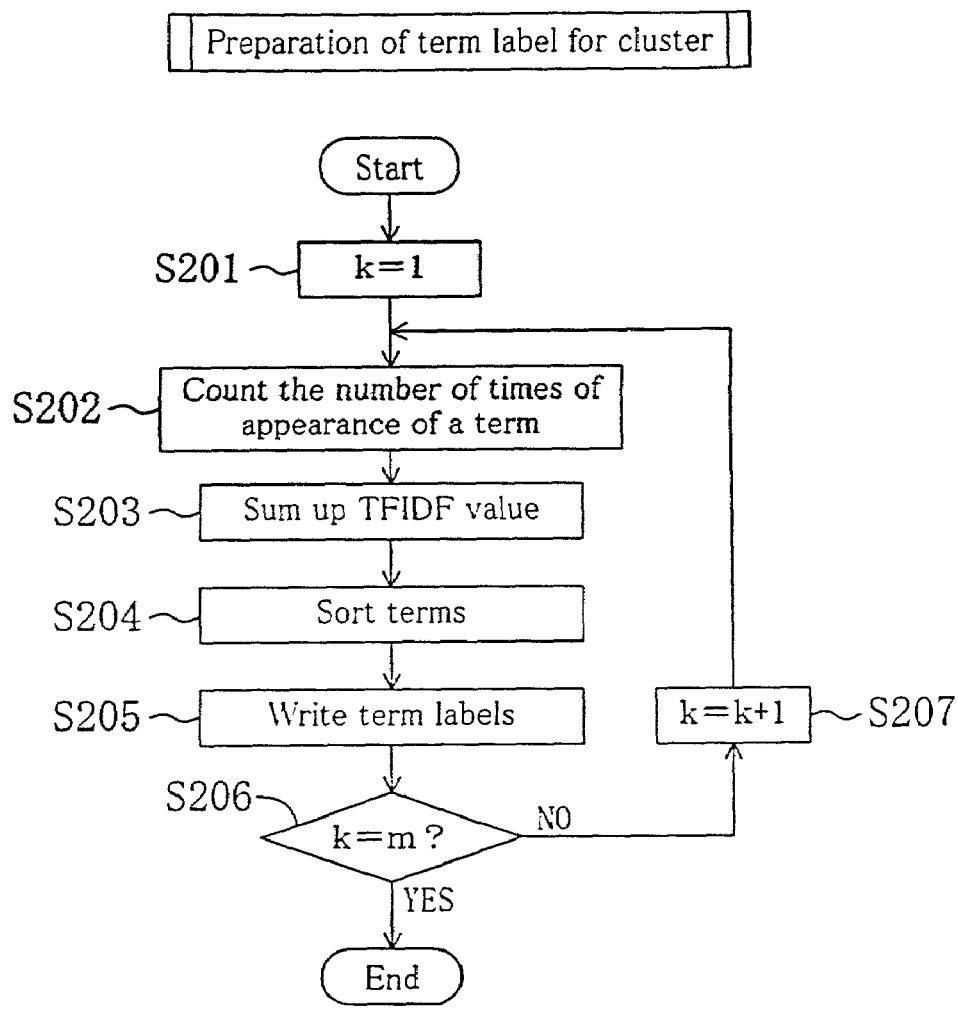
FIG. 8 is a flowchart of a procedure of term label preparation by a cluster label preparation section in FIG. 1.
FIG. 9 is a view showing examples of prepared term labels.

FIG. 8 shows a procedure of term label preparation by the cluster label preparation section 17 shown in FIG. 1. In step S201, a cluster counter k is set at k=1. In step S202, for each term Tj contained in the feature vectors Vi of all the documents Di as the elements of the cluster Ck, counted is the number of documents in which the term Tj appears (term-appearing documents) among all the documents Di as the elements of the cluster Ck. In Step S203, for each term Tj contained in all the documents Di as the elements of the cluster Ck, calculated is the sum of the TFIDF values (=Wij) of the term Tj for all the documents Ti as the elements of the cluster Ck. In step S204, all the terms Tj contained in the feature vectors Vi of all the documents Di as the elements of the cluster Ck are sorted in order of decreasing of the number of term-appearing documents obtained in step S202. If two terms have the same number of term-appearing documents, the terms Tj are sorted in order of decreasing of the total TEIDF value. In step S205, the top-ranked three terms in the sorting in step S204 are selected and written in the cluster label storage section 13 as term labels of the cluster. In step S206, it is determined whether or not the processing covering steps S202 through S205 has been completed for all the clusters. If completed, that is, k=m, the process is terminated. Otherwise, the process proceeds to step S207. In step S207, the counter k is incremented by one, and the process returns to step S202.

FIG. 9 shows examples of term labels written in the cluster label storage section 13. For example, FIG. 9 indicates that cluster 1 has term labels, "sweet stuff", "snacks", and "cheese". In the term label preparation described above, the terms were sorted according to the number of term-appearing documents. Alternatively, other methods such as sorting according to only the TEIDF value may be employed. The number of term labels selected was three in the illustrated example, but it may be a number other than three.

Figures 10, 11:
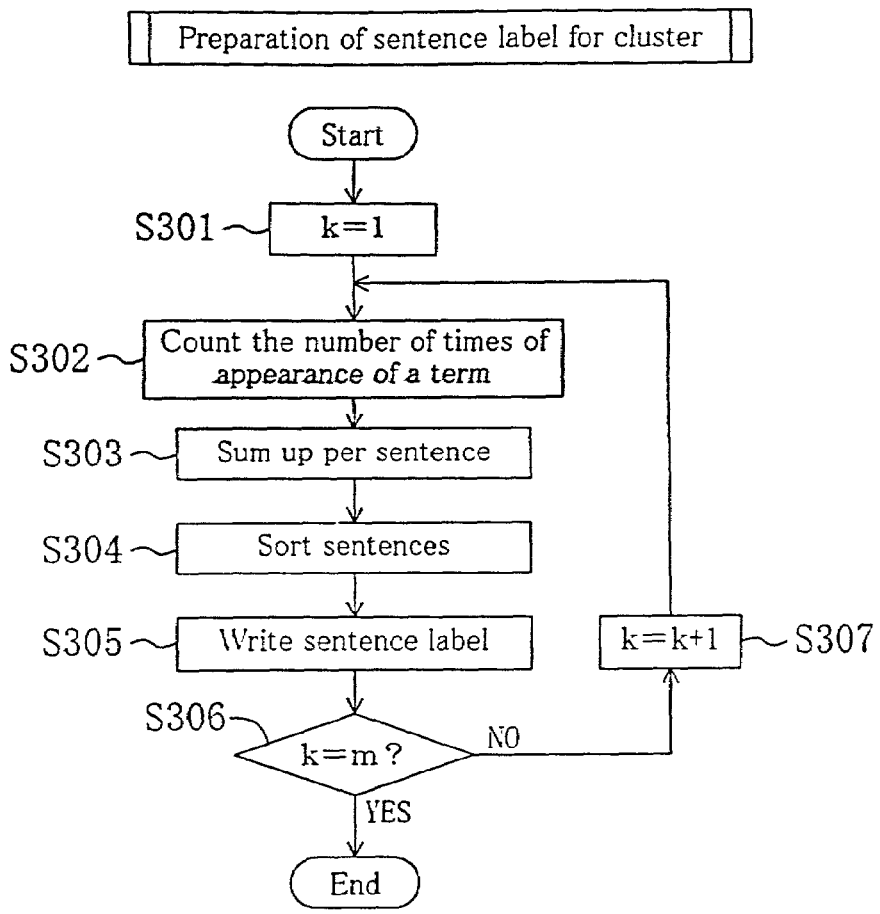
FIG. 10 is a flowchart of a procedure of sentence label preparation by the cluster label preparation section in FIG. 1.
FIG. 11 is a view showing examples of prepared sentence labels.

FIG. 10 shows a procedure of sentence label preparation by the cluster label preparation section 17 shown in FIG. 1. In step S301, a cluster counter k is set at k=1. In step S302, for each term Tj contained in the feature vectors Vi of all the documents Di as the elements of the cluster Ck, counted is the number of documents in which the term Tj appears (term-appearing documents) among all the documents Di as the elements of the cluster Ck. In Step S303, for each sentence constituting all the documents Di as the elements of the cluster Ck, calculated is the sum of the numbers of term-appearing documents counted in step S302 for the terms Tj contained in the sentence. The sentence as used herein refers to a character string delimitated with full stops such as ". " In step S304, sentences constituting all the documents Di as the elements of the cluster Ck are sorted in order of decreasing of the sum of the numbers of term-appearing documents obtained in step S303. In step S305, the top-ranked sentence in the sorting in step S304 is selected and written in the cluster label storage section 13 as the sentence label of each cluster. If a plurality of top-ranked sentences exist, one having the smallest number of characters is selected. In step S306, it is determined whether or not the processing covering steps S302 through S305 has been completed for all the clusters. If completed, that is, k=m, the process is terminated. Otherwise, the process proceeds to step S307. In step S307, the counter k is incremented by one, and the process returns to step S302.

FIG. 11 shows examples of sentence labels written in the cluster label storage section 13. For example, FIG. 11 indicates that cluster 1 has a sentence label, "Watery food (jelly, pudding, yogurt) . . . " In the sentence label preparation described above, the sentences were sorted according to the sum of the numbers of term-appearing documents. Alternatively, other methods such as sorting according to the sum of the TEIDF values may be adopted. A sentence having the smallest number of characters was selected when a plurality of top-ranked sentences exist. Alternatively, other methods may be employed. For example, a sentence the head of which is located nearest to the beginning of the document may be selected.

Figure 12:
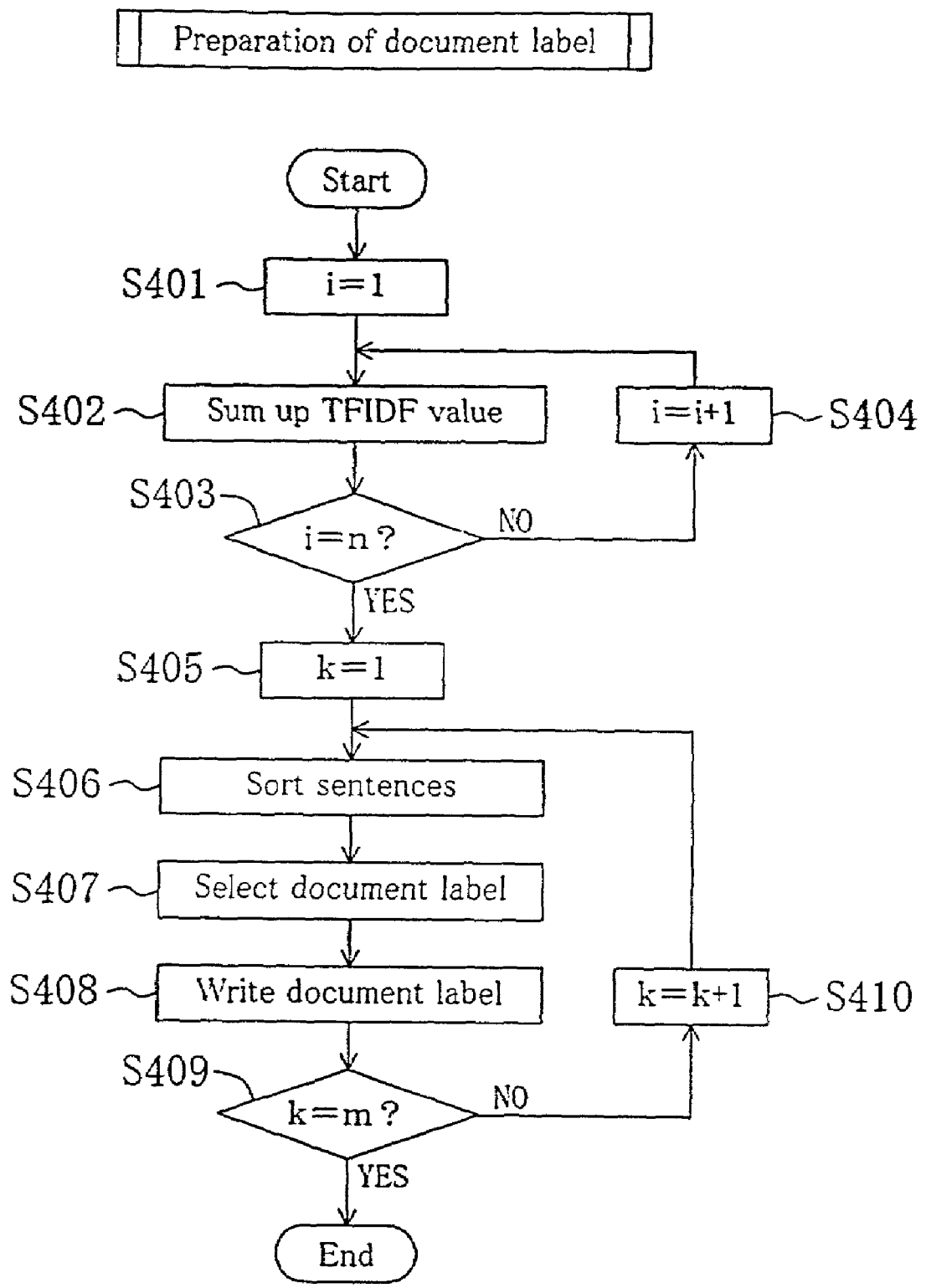
FIG. 12 is a flowchart of a procedure of document label preparation by a document label preparation section in FIG. 1.

FIG. 12 shows a procedure of document label preparation by the document label preparation section 18 shown in FIG. 1. In step S401, a document counter i is set at i=1. In step S402, for each sentence constituting the document Di, the sum of the TFIDF values (=Wij) of all the terms Tj contained in the sentence is calculated. In step S403, it is determined whether or not the processing in step S402 has been completed for all the documents. If completed, that is, I=n, the process proceeds to step S405. Otherwise, the process proceeds to step S404. In step S404, the counter i is incremented by one, and the process returns to step S402. In step S405, a cluster counter k is set at k=1. In step S406, the sentences constituting each of the documents Di as the elements of the cluster Ck are sorted in order of decreasing of the sum obtained in step S402. In step S407, the top-ranked sentence in the sorting in step S406 is selected as the document label for the document Di. If the selected sentence is the same as the sentence label for the cluster prepared by the cluster label preparation section 17, the second-ranked sentence in the sorting in step S406 is selected as the document label for the document Di. In step S408, the document label for the document Di selected in step S407 is written in the document label storage section 14. In step S409, it is determined whether or not the processing covering steps S406 through S408 has been completed for all the clusters. If completed, that is, k=m, the process is terminated. Otherwise, the process proceeds to step S410. In step S410, the counter k is incremented by one, and the process returns to step S406.

FIG. 13 shows examples of document labels written in the document label storage section 14. For example, FIG. 13 indicates that document 1 included in cluster 1 has a document label, "eat chewy one that gives the feeling of satisfaction . . . "

Thus, by following the above procedures, feature vectors are extracted from each document during the document entry, and clusters, cluster labels, and documents labels are prepared and stored in the respective storage sections.

<Document retrieval operation>

First, the interface section 20 receives a retrieval condition for a document via the user input section 21. The database retrieval section 19 retrieves a document satisfying the retrieval condition from the document storage section 11, retrieves a cluster including the retrieved document from the cluster storage section 12, retrieves documents included in the retrieved cluster from the document storage section 11 again, and sends the results to the interface section 20 together with the relevant cluster label and document labels. The interface section 20 presents the retrieval results to the user via the user display section 22 (FIG. 3).

In this embodiment, given documents were stored in advance. Alternatively, documents may be newly stored or revised afterward via a recording medium such as an optical disk or a network medium such as the Internet. For document retrieval, full-text search or fuzzy search may be adopted, in place of the search by keyword and document ID.

EMBODIMENT 2

Figure 14:
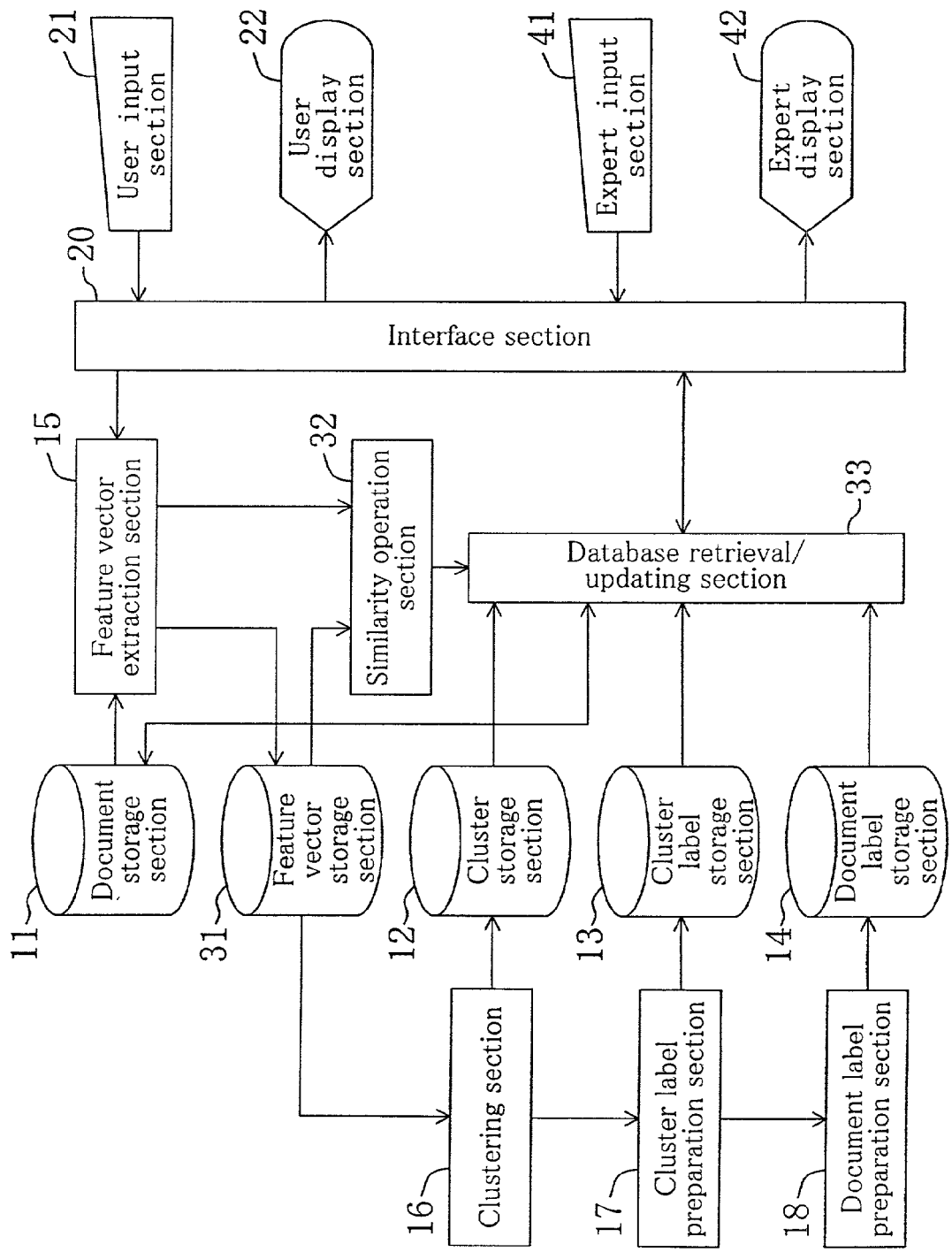
FIG. 14 is a block diagram of an information retrieval system of EMBODIMENT 2 of the present invention.

FIG. 14 illustrates a construction of the information retrieval system of EMBODIMENT 2 of the present invention. The information retrieval system of FIG. 14 is a system that returns an appropriate answer to a user's natural language question by searching the past cases. This system is implemented by a document server, a user terminal, and an expert terminal connected with one another via the Internet, for example. The construction of FIG. 14 includes a feature vector storage section 31, a similarity operation section 32, an expert input section 41, and an expert display section 42, in addition to the components of the information retrieval system of FIG. 1. In addition, a database retrieval/updating section 33 replaces the database retrieval section 19 in FIG. 1. The document storage section 11 stores a plurality of question documents and a plurality of answer documents associated with each other. The expert display section 42 presents retrieval results to an expert. The expert input section 41 receives an entry of a choice or a natural language answer from the expert. The interface section 20 manages input/output with the user and with the expert. The feature vector extraction section 15 has a function of extracting feature vectors from the question documents and the answer documents stored in the document storage section 11, a function of extracting feature vectors from the natural language question input by the user (user question), and a function of extracting feature vectors from the natural language answer input by the expert (expert answer). The feature vector storage section 31 stores the feature vectors extracted from the question documents and the answer documents in the document storage section 11 by the feature vector extraction section 15. The similarity operation section 32 has a function of determining the similarity between the feature vectors extracted from the user question and the feature vectors extracted from the question documents stored in the feature vector storage section 31, and a function of determining the similarity between the feature vectors extracted from the expert answer and the feature vectors extracted from the answer documents stored in the feature vector storage section 31. The database retrieval/updating section 33 has a function of updating the document storage section 11 based on an answer of the user or the expert, in addition to a function of retrieving a document in the document storage section 11.

FIGS. 15 and 16 show examples of documents stored in the document storage section 11 shown in FIG. 14. FIG. 15 shows a table of questions that collects the question documents as one part of the document storage section 11. Each entry of this table is constructed of unique question ID, a question text, and answer ID associated with the question. FIG. 16 shows a table of answers that collects the answer documents as the other part of the document storage section 11. Each of entry of this table is constructed of unique answer ID and an answer text. Herein, the i-th question is denoted by Qi and the k-th answer is denoted by Ak ($1 \leq i \leq n$ and $1 \leq k \leq n$), where n and k has the relation of $n \geq m$. That is, there is a case that one answer is associated with a plurality of questions.

FIG. 17 shows an example of display of the retrieval results by the expert display section 42. In FIG. 17, answer candidates classified into clusters are displayed every cluster together with the sentence label of the cluster and the document labels underlined in the documents, in addition to the question from the user. In the example shown in FIG. 17, all retrieval results can be displayed by pressing "previous cluster" and "next cluster" buttons with a mouse to open other pages. Thus, with reference to the retrieval results displayed in clusters of similar documents, the expert can select the most appropriate answer easily. Alternatively, the expert may enter a natural language expert answer. In the example shown in FIG. 17, a sentence label was displayed as the cluster label. A term label may also be displayed in addition to, or in place of the sentence label. Although the cluster ID and the document ID were displayed as part of the retrieval results, these may be omitted.

FIG. 18 shows an example of display of the retrieval results by the user display section 22. This exemplifies the case that document 1 was selected as the expert answer.

Hereinafter, details of EMBODIMENT 2 will be described by separating the operation thereof into document entry operation and document retrieval operation, as in EMBODIMENT 1.

<Document entry operation>

First, the feature vector extraction section 15 extracts question feature vectors VQi and answer feature vectors VAk from all the documents stored in the document storage section 11, and writes the extracted feature vectors in the feature vector storage section 31. The procedure of feature vector extraction is the same as that in EMBODIMENT 1, except that feature vectors are extracted from both the question and answer documents and that the extracted feature vectors are written in the feature vector storage section 31.

Next, the clustering section 16 reads the answer feature vectors VAk from the feature vector storage section 31, classifies all the answer documents into clusters, and writes the clusters in the cluster storage section 12. The procedure of clustering is the same as that described in EMBODIMENT 1, except that the answer feature vectors VAk are used for the clustering. The operations of the cluster label preparation section 17 and the document label preparation section 18 are the same as those in EMBODIMENT 1.

By following the above procedures, feature vectors are extracted from both question and answer documents during document entry, and, for the answer documents, clusters, cluster labels, and document labels are prepared and stored in the respective storage sections.

<Document retrieval operation>

First, the interface section 20 receives a natural language user question Q via the user input section 21. The feature vector extraction section 15 extracts feature vectors VQ from the user question Q.

FIG. 19 shows a procedure of user question feature vector extraction by the feature vector extraction section 15 shown in FIG. 14. In step S501, a term Tj appearing in the user question Q is extracted from the user question Q, and the frequency Fij of the term Tj appearing in the question is counted. The term extraction is performed as described in EMBODIMENT 1. In step S502, the IDF value of the term Tj is calculated. If the term Tj already exists in any of the documents stored in the document storage section 11, the IDF value of the term Tj should have been calculated during document entry. This calculated IDF value is therefore used in step S502. If the term Tj does not exist, the IDF value of the term Tj (IDFj) is calculated from expression (5) below.

$$IDFj = \log(n+1) + 1 \ldots \quad (5)$$

In step S503, the weight WQj (TFIDF value) of the term Tj in the user question Q is calculated. The calculation of the TFIDF value is performed as described in EMBODIMENT 1. FIG. 20 shows examples of feature vectors VQ extracted from the user question Q.

Next, the similarity operation section 32 retrieves the feature vectors VQi of all the questions from the feature vector storage section 31, and calculates the similarity between the retrieved feature vectors VQi and the feature vector VQ of the user question.

Figure 21:
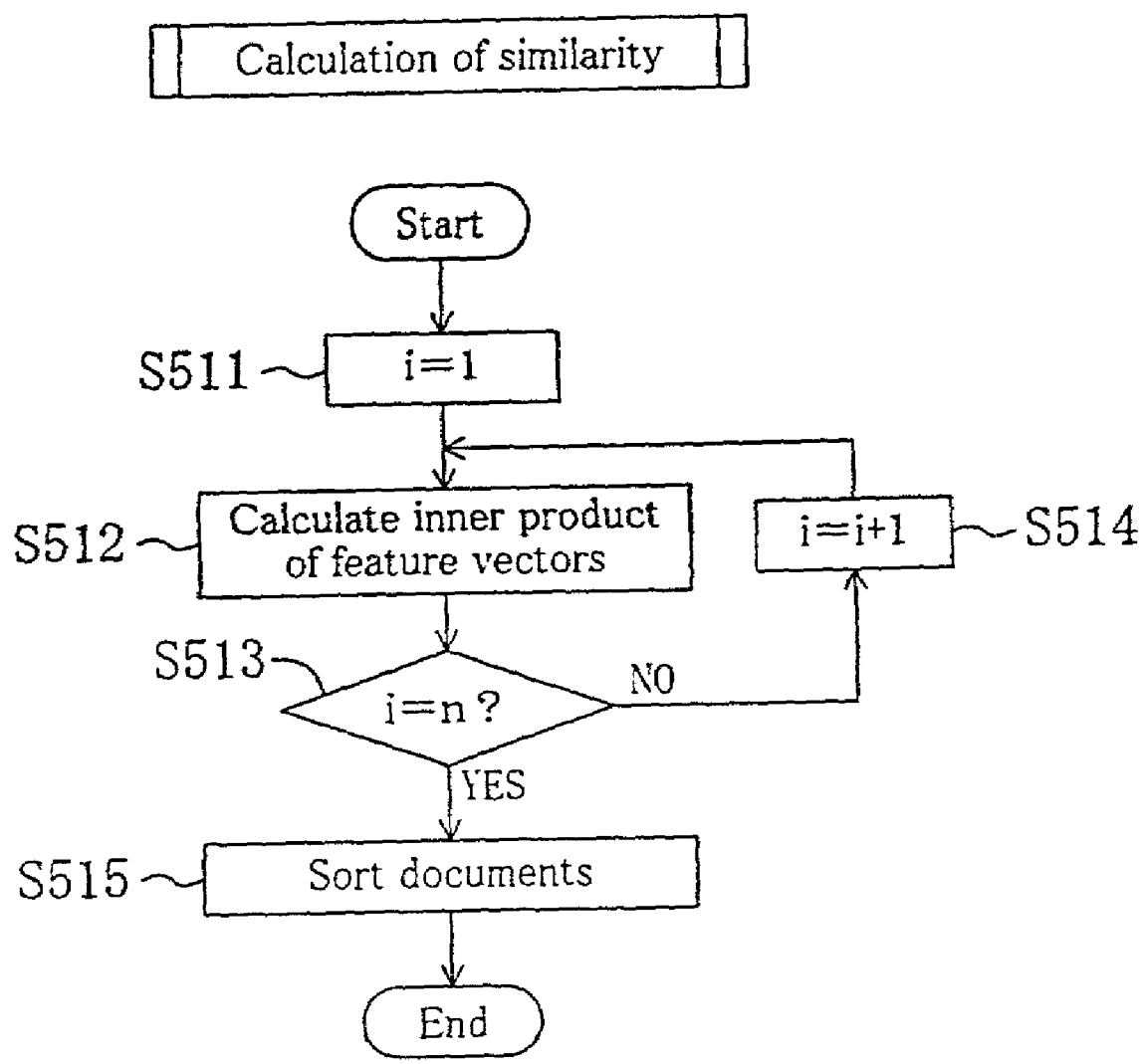
FIG. 21 is a flowchart of a procedure of processing by a similarity operation section in FIG. 14.

FIG. 21 shows a procedure of similarity calculation by the similarity operation section 32 shown in FIG. 14. In step S511, a document counter i is set at i=1. In step S512, the similarity Ei between the feature vector VQi and the feature vector VQ of the user question is calculated from expression (6) below as an inner product of the vectors.

$$Ei = VQi \cdot VQ = \frac{\sum_j Wij \cdot WQj}{|VQi| \cdot |VQ|} \quad (6)$$

In step S513, it is determined whether or not the processing step S512 has been completed for all the question documents. If completed, that is, i=n, the process proceeds to S515. Otherwise, the process proceeds to step S514. In step S514, the counter i is incremented by one and the process returns to step S512. In step S515, all the question documents are sorted in order of decreasing of the similarity Ei obtained in step S512.

Next, the database retrieval/updating section 33 retrieves a given number of top-ranked question documents having higher similarity Ei and the answer documents associated with these question documents, from the document storage section 11. The database retrieval/updating section 33 also retrieves a cluster or clusters that include the retrieved answer documents from the cluster storage section 12, and retrieves answer documents included in the retrieved cluster(s) from the document storage section 11 again. The database retrieval/updating section 33 then sends the results to the interface section 20 together with the relevant cluster label(s) and document labels. In the above description, the inner product of feature vectors was used for calculation of the similarity of the feature vectors. Alternatively, other methods such as that using the similarity ratio of vectors may be employed.

The interface section 20 presents the answer part of the retrieval results to the expert via the expert display section 42 (FIG. 17). The interface section 20 also receives an entry of a choice or a natural language answer by the expert made with reference to the display via the expert display section 42. Moreover, the interface section 20 presents the expert answer to the user via the user display section 22 (FIG. 18). This enables only useful information to be presented to the user.

Figure 22:
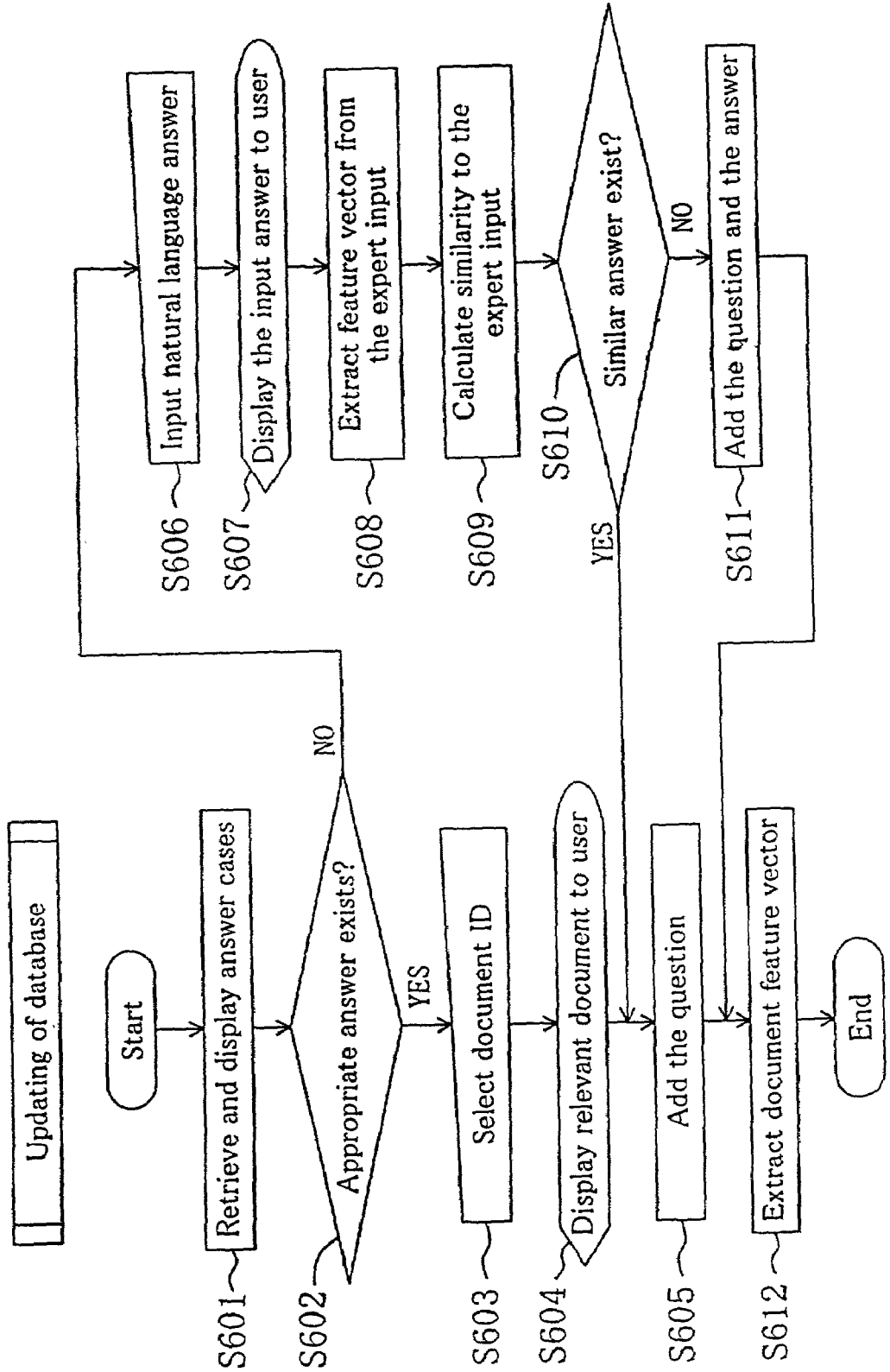
FIG. 22 is a flowchart mainly showing a procedure of processing by a database retrieval/updating section in FIG. 14.

FIG. 22 is a flowchart of a procedure of processing by the database retrieval/updating section 33 shown in FIG. 14. In step S601, the retrieval results of past answer cases are displayed. Specifically, the interface section 20, which has received a natural language user question Q, presents retrieval results of answers to the user question to the export via the expert display section 42 (FIG. 17). In step S602, the expert examines the retrieval results. Specifically, the expert determines whether or not there is an answer considered appropriate for the user question Q in the retrieval results displayed shown in FIG. 17. If there is an answer considered appropriate, the process proceeds to step S603. Otherwise, the process proceeds to step S606. In step S603, the expert selects the document ID of the answer considered most appropriate for the user question Q. The interface section 20 receives the input of the selected document ID via the expert input section 41. The interface section 20 hands over the received document ID to the database retrieval/updating section 33 for processing in step S605 to be described later. In step S604, the interface section 20 presents to the user the document identified by the document ID selected by the expert as the answer (FIG. 18).

In step S605, question addition processing is performed. The database retrieval/updating section 33, which receives the document ID from the interface section 20, examines one or more questions associated with the answer having the received document ID and determines the question having the highest similarity to the user question Q among the one or more questions. If the similarity of the question having the highest similarity is equal to or less than a predetermined value, the database retrieval/updating section 33 determines that no appropriate automatic answer was available, and adds a new entry composed of a new unique question ID, the user question Q, and the selected document ID to the table of questions shown in FIG. 15. The process then proceeds to step S612, where the feature vector extraction section 15 extracts feature vectors VQi and VAk from all the questions Qi and answers Ak stored in the document storage section 11, and writes the extracted feature vectors in the feature vector storage section 31, as is done during the document entry.

If no appropriate answer is found in step S602, the expert inputs an appropriate natural language answer A for the user question Q in step S606. The interface section 20 receives the natural language answer A via the expert input section 41. In step S607, the interface section 20 presents the answer A input by the expert to the user. In step S608, the feature vector extraction section 15 extracts feature vectors VA from the answer A input by the expert. The procedure of this extraction is substantially the same as the procedure of extraction of feature vectors VQ from the user question Q described with reference to FIG. 19. In step S609, the similarity operation section 32 retrieves the feature vectors VAk of all the answers from the feature vector storing section 31, and calculates the similarity Ek of the retrieved feature vectors VAk to the feature vector VA of the answer A input by the expert. The procedure of calculation of the similarity is substantially the same as that adopted for the similarity to the user question Q described with reference FIG. 21. In step S610, if the highest one of the similarity values Ek obtained in step S609 is equal to or more than a predetermined value, the similarity operation section 32 determines that there is the answer similar to the answer A input by the expert in the document storage section 11, and hands over the document ID of the similar answer Ak to the database retrieval/updating section 33. The process then proceeds to step S605. Otherwise, the process proceeds to the step S611. In step S611, question/answer addition processing is performed. Specifically, the database retrieval/updating section 33 adds an entry composed of a new unique question ID and the answer input by the expert to the table of answers shown in FIG. 16. Likewise, the database retrieval/updating section 33 adds an entry composed of a new unique question ID, the user question Q, and the document ID identifying the added answer. The process then proceeds to step S612, where the processing described above is performed.

In the case of no expert being available for selecting or inputting an answer, the interface section 20 presents the retrieval results as shown in FIG. 17 to the user via the user display section 22. The user examines the display shown in FIG. 17 and selects the document ID of an answer that is considered most appropriate to the user question Q. The interface section 20 receives the input of the selected document ID via the user input section 21. The database retrieval/updating section 33, which receives the selected document ID from the interface section 20, examines one or more questions associated with the answer having the received document ID and determines the question having the highest similarity to the user question Q among the one or more questions. If the similarity of the question having the highest similarity is equal to or less than a predetermined value, the database retrieval/updating section 33 determines that no appropriate automatic answer was available, and adds a new entry composed of a new unique question ID, the user question Q, and the selected document ID to the table of questions shown in FIG. 15. (same as the processing in step S605). The feature vector extraction section 15 extracts the feature vectors VQi and VAk from all the questions Qi and answers Ak stored in the document storage section 11, and writes the extracted feature vectors in the feature vector storage section 31, as is done during the document entry (same as the processing in step S612).

Thus, in EMBODIMENT 2, the document storage section 11 is automatically updated based on the answer of the user or the expert. As a result, the information retrieval system of this embodiment can present an appropriate answer when like questions are input on subsequent occasions.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. An information retrieval computer implemented system for retrieving information a user seeks from a plurality of documents, comprising:
   feature amount extraction means for extracting a feature amount of each of the plurality of documents stored in document storage means;
   clustering means for classifying the plurality of documents into a plurality of clusters based on the extracted feature amounts so that each cluster includes one document or a plurality of documents having feature amounts similar to each other as an element;
   cluster term label preparation means for automatically selecting one or more terms, which is or are arranged in order of high term score, as a label of the cluster, for each of the plurality of clusters, the term score being obtained by calculating the number of documents in which a term appears in the cluster, for each of the terms included in documents belonging to the cluster;

document retrieval means for retrieving a document satisfying a retrieval condition input by the user among the plurality of documents; and interface means for presenting the retrieved document together with the label of the cluster, to which the retrieved document belongs, and the rest of documents belonging to the cluster, as retrieval results, wherein the feature amount extraction means extract feature vectors as the feature amount, the feature vector is a vector having as an element a pair of a keyword of each of the plurality of documents stored in the document storage means, and a weight of the keyword, and the clustering means classify the plurality of documents into a plurality of clusters so that each cluster includes as an element one document among the plurality of documents, in which a ratio between the minimum value and the maximum value of the sum of the weight of the same keywords in the feature amount is large.

2. An information retrieval computer implemented system for retrieving information a user seeks from a plurality of documents, comprising:

feature amount extraction means for extracting a feature amount of each of the plurality of documents stored in document storage means;

clustering means for classifying the plurality of documents into a plurality of clusters based on the extracted feature amounts so that each cluster includes one document or a plurality of documents having feature amounts similar to each other as an element;

cluster sentence label preparation means for automatically selecting one sentence as a label of the cluster based on a term score for each of the plurality of clusters, the sentence being included in documents belonging to the cluster, the term score being obtained by calculating the number of documents in which a term appears in the cluster, for each of the terms included in documents belonging to the cluster;

document retrieval means for retrieving a document satisfying a retrieval condition input by the user among the plurality of documents; and interface means for presenting the retrieved document together with the label of the cluster, to which the retrieved document belongs, and the rest of documents belonging to the cluster, as retrieval results, wherein the feature amount extraction means extract feature vectors as the feature amount, the feature vector is a vector having as an element a pair of a keyword of each of the plurality of documents stored in the document storage means, and a weight of the keyword, and the clustering means classify the plurality of documents into a plurality of clusters so that each cluster includes as an element one document among the plurality of documents, in which a ratio between the minimum value and the maximum value of the sum of the weight of the same keywords in the feature amount is large.

3. The information retrieval computer implemented system of claim 2, wherein, the cluster sentence label preparation means work out a sum of term scores of all terms included in the sentence, and select a sentence in which the sum of the term scores is largest as a label of the cluster, for each of the sentences included in documents belonging to the cluster, and when a plurality of sentences in which the sum of the term scores is largest exist, one sentence having the smallest number of characters is selected.

4. An information retrieval computer implemented system for retrieving information a user seeks from a plurality of documents, comprising:

feature amount extraction means for extracting a feature amount of each of the plurality of documents stored in document storage means;

clustering means for classifying the plurality of documents into a plurality of clusters based on the extracted feature amounts so that each cluster includes one document or a plurality of documents having feature amounts similar to each other as an element;

cluster label preparation means for automatically generating a cluster label representing the contents of the cluster based on terms contained in feature vectors, for each of the plurality of clusters;

document label preparation means for preparing a document label representing the contents of the document, for each of the clustered documents;

document retrieval means for retrieving a document satisfying a retrieval condition input by the user among the plurality of documents; and interface means for presenting the retrieved document together with the cluster label of the cluster to which the retrieved document belongs, the rest of documents belonging to the cluster, and the document labels which are associated with each of the retrieved document and the rest of documents, as retrieval results, wherein the feature amount extraction means extract feature vectors as the feature amount, the feature vector is a vector having as an element a pair of a keyword of each of the plurality of documents stored in the document storage means, and a weight of the keyword, and the clustering means classify the plurality of documents into a plurality of clusters so that each cluster includes as an element one document among the plurality of documents, in which a ratio between the minimum value and the maximum value of the sum of the weight of the same keywords in the feature amount is large.

5. The information retrieval computer implemented system of claim 4, wherein, the document label preparation means selects as the document label one sentence in which the sum of TFIDF values of the terms included in the document is large among all the sentences included in the document.

6. An information retrieval computer implemented system for retrieving information a user seeks from a plurality of answer documents, comprising:

document storage means for storing the plurality of answer documents and a plurality of question documents, at least one or more question documents being associated with each of the answer documents;

feature amount extraction means for extracting a feature amount of each of the plurality of answer documents;

clustering means for classifying the plurality of answer documents into a plurality of clusters based on the extracted feature amounts so that each cluster includes one document or a plurality of documents having feature amounts similar to each other as an element;

wherein said clustering means is configured to programmatically enforce a rule wherein the number of the plurality of clusters is determined such that the number of clusters having two or more elements of the plurality of clusters is maximized;

question document retrieval means for retrieving a question document conforming with a user question input by the user among the plurality of question documents; and interface means for presenting the retrieved question document and the answer document associated with the question document together with the rest of answer documents included in the cluster to which the answer document belongs, as retrieval results, wherein the feature amount extraction means extract feature vectors as the feature amount, the feature vector is a vector having as an element a pair of a keyword of each of the plurality of documents stored in the document storage means, and a weight of the keyword, and the clustering means classify the plurality of documents into a plurality of clusters so that each cluster includes as an element one document among the plurality of documents, in which a ratio between the minimum value and the maximum value of the sum of the weight of the same keywords in the feature amount is large.

7. The information retrieval computer implemented system of claim 6, wherein, the interface means receives selection of an answer document by the user among the answer documents of the presented retrieval results, and the information retrieval system further comprises document upgrading means for newly storing the document of the user question in the document storage means in association with the selected answer document.

8. The information retrieval computer implemented system of claim 7, wherein, the document updating means newly stores the document of the user question in the document storage means in association with the selected answer document when the similarity of the document of the user question and the question document confirming with the user question is less than a predetermined value.

9. The information retrieval computer implemented system of claim 2, wherein, the cluster sentence label preparation means work out a sum of term scores of all terms included in the sentence, and select a sentence in which the sum of the term scores is largest as a label of the cluster, for each of the sentences included in documents belonging to the cluster, and when a plurality of sentences in which the sum of the term scores is largest exist, a sentence the head of which is located nearest to the beginning of the document is selected.

* * * * *